(12) United States Patent
Asbury et al.

(10) Patent No.: US 12,013,080 B1
(45) Date of Patent: Jun. 18, 2024

(54) FOLDABLE CELL PHONE STAND

(71) Applicants: Carter Carpentieri Asbury, Houston, TX (US); Sarah Carpentieri-Asbury, Houston, TX (US)

(72) Inventors: Carter Carpentieri Asbury, Houston, TX (US); Sarah Carpentieri-Asbury, Houston, TX (US)

( * ) Notice: Subject to any disclaimer, the term of this patent is extended or adjusted under 35 U.S.C. 154(b) by 0 days.

(21) Appl. No.: 17/949,985

(22) Filed: Sep. 21, 2022

(51) Int. Cl.
*A47B 23/04* (2006.01)
*F16M 11/20* (2006.01)
*H04M 1/04* (2006.01)

(52) U.S. Cl.
CPC .......... *F16M 11/2021* (2013.01); *H04M 1/04* (2013.01); *A47B 23/043* (2013.01); *A47B 23/044* (2013.01)

(58) Field of Classification Search
CPC ............................ A47B 23/043; A47B 23/044
USPC ....... 248/447, 448, 449, 450, 451, 454, 455, 248/456, 457, 458, 460, 461, 462
See application file for complete search history.

(56) References Cited

U.S. PATENT DOCUMENTS

| | | | | |
|---|---|---|---|---|
| 1,829,455 A | * | 10/1931 | Riley | B42D 5/005 248/460 |
| 5,607,135 A | * | 3/1997 | Yamada | A47G 1/1646 248/463 |
| 11,359,761 B2 | * | 6/2022 | Liu | F16M 11/10 |
| 2010/0090085 A1 | * | 4/2010 | Corrion | F16M 11/38 248/459 |
| 2019/0326767 A1 | * | 10/2019 | Fan | H02J 50/10 |

\* cited by examiner

*Primary Examiner* — Alfred J Wujciak
(74) *Attorney, Agent, or Firm* — Plager Schack LLP; Mark H. Plager; Kara K. Verryt

(57) ABSTRACT

A device for holding a personal item at an adjustable angle may include a base frame having a first end and a second end; a swing arm pivotably engaged with the base frame such that an angle of the swing arm with respect to the base frame is adjustable from flush with the base frame to perpendicular to the base frame; and a personal item notch built into the first end of the base frame, wherein the personal item notch is sized to accommodate placement of the personal item therein. The swing arm may have an adjustable length, wherein the length of the swing arm and the angle of the swing arm may be held at the desired length and angle due to friction.

6 Claims, 4 Drawing Sheets

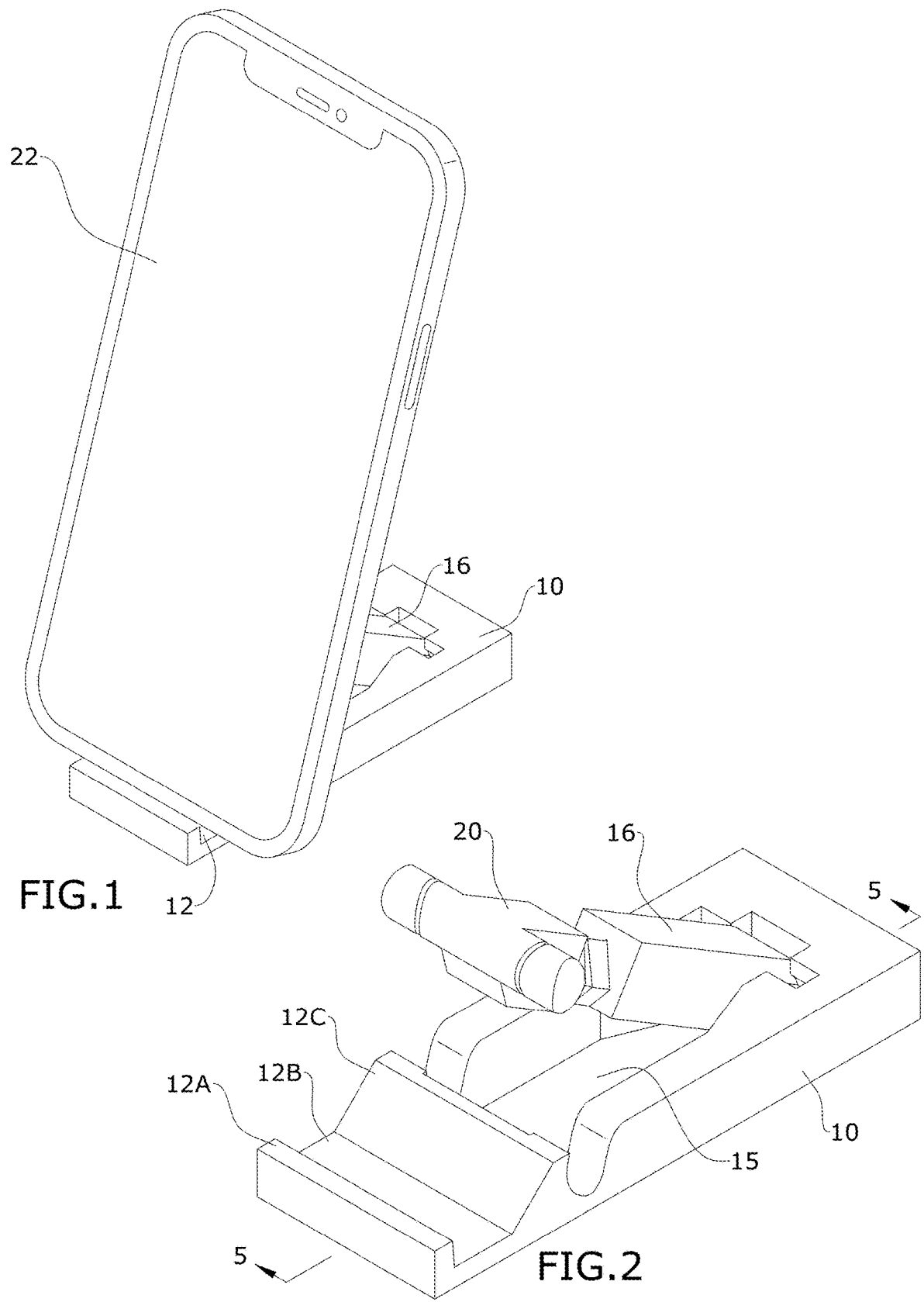

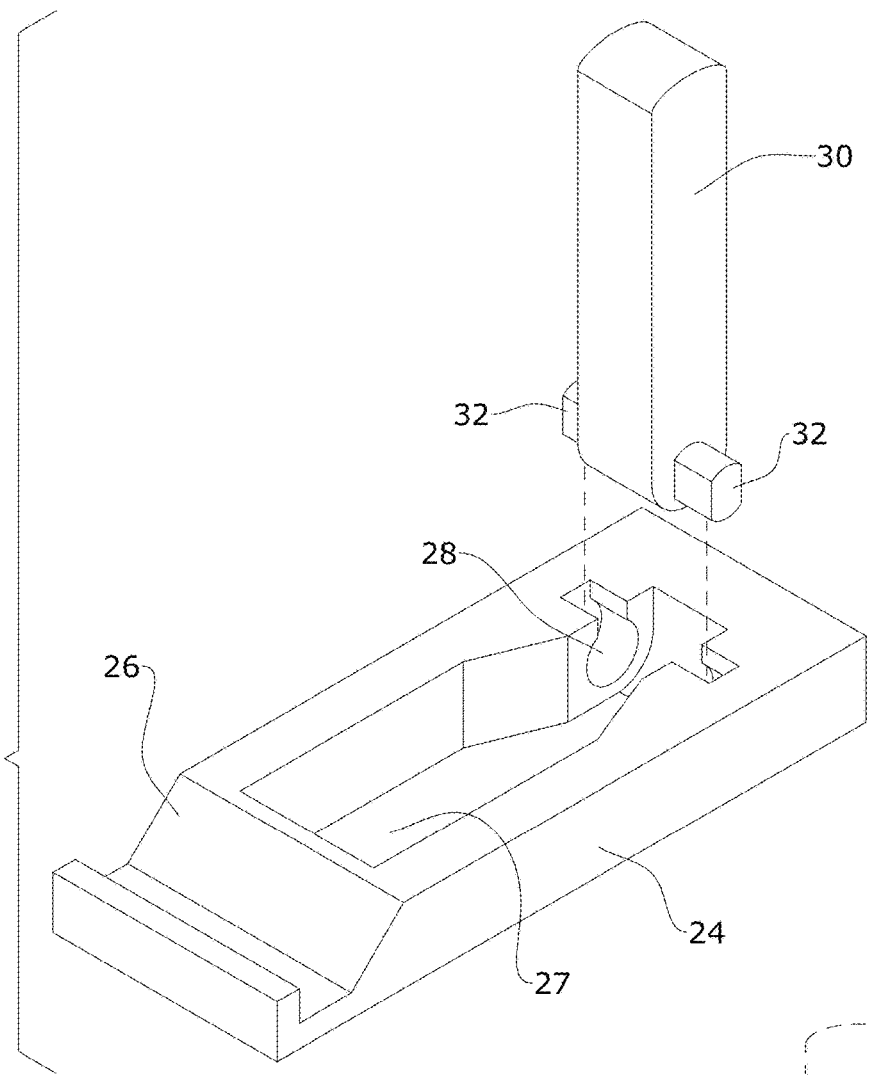
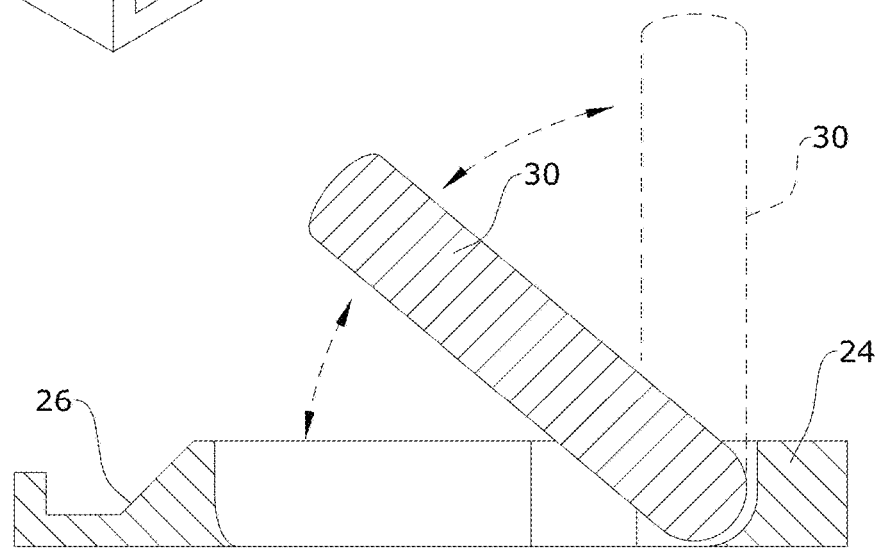

FOLDABLE CELL PHONE STAND

BACKGROUND

The embodiments described herein relate generally to cell phone accessories and, more particularly, to a foldable, portable, and hands-free support for cell phones or similar devices.

Many individuals need or want to user their cell phones at desks, workstations, tables, and the like. Often times, it is desirable to have the cell phones held up right at an appropriate angle for viewing, video chatting, or the like, while at the same time keeping their hands free for other tasks. Due to different lighting situations, the viewing angle of a phone often needs to be adjusted. Unfortunately, however, most existing phone stands do not have an adjustable viewing angle. Moreover, many phone stands are not easily portable and cannot comfortably fit into a user's pocket.

Therefore, what is needed is a cell phone holder with an adjustable viewing angle, wherein the holder is easily transported and stored in, for example, a pocket or other similar small space.

SUMMARY

Some embodiments of the present disclosure include a device for holding a personal item at an adjustable angle may include a base frame having a first end and a second end; a swing arm pivotably engaged with the base frame such that an angle of the swing arm with respect to the base frame is adjustable from flush with the base frame to perpendicular to the base frame; and a personal item notch built into the first end of the base frame, wherein the personal item notch is sized to accommodate placement of the personal item therein. The swing arm may have an adjustable length, wherein the length of the swing arm and the angle of the swing arm may be held at the desired length and angle due to friction.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of one embodiment of the present disclosure, shown in use.

FIG. 2 is a perspective view of one embodiment of the present disclosure.

FIG. 7 is an exploded view of one embodiment of the present disclosure.

FIG. 8 is a section view of one embodiment of the present disclosure, taken along line 8-8 in FIG. 6.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a portable phone stand with an adjustable viewing angle and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-8, some embodiments of the present disclosure include a device for holding a personal item, such as a cell phone 22, at an adjustable angle, the device comprising a base frame, a swing arm pivotably engaged with the base frame such that the angle of the swing arm with respect to the base frame is adjustable from flush with the base frame to perpendicular to the base frame, and a personal item notch built into a first end of the base frame, wherein the personal item notch is sized to accommodate placement of a personal item therein.

More specifically, as shown in FIGS. 1-4, some embodiments of the device may comprise a base frame 10 having a substantially rectangular overall shape, wherein a first end of the base frame 10 has a personal item notch 12 extending therein, wherein the personal item notch 12 is sized to accommodate placement of a device, such as a cell phone 22 therein. As shown in the Figures, the personal item notch 12 may comprise a raised front lip 12A, a bottom surface 12B extending substantially perpendicularly from the raised front lip 12A toward a second end of the base frame 10, and an angled back wall 12C extending at an angle upwards from the bottom surface 12B and toward the second end of the base frame 10.

Figure 3:
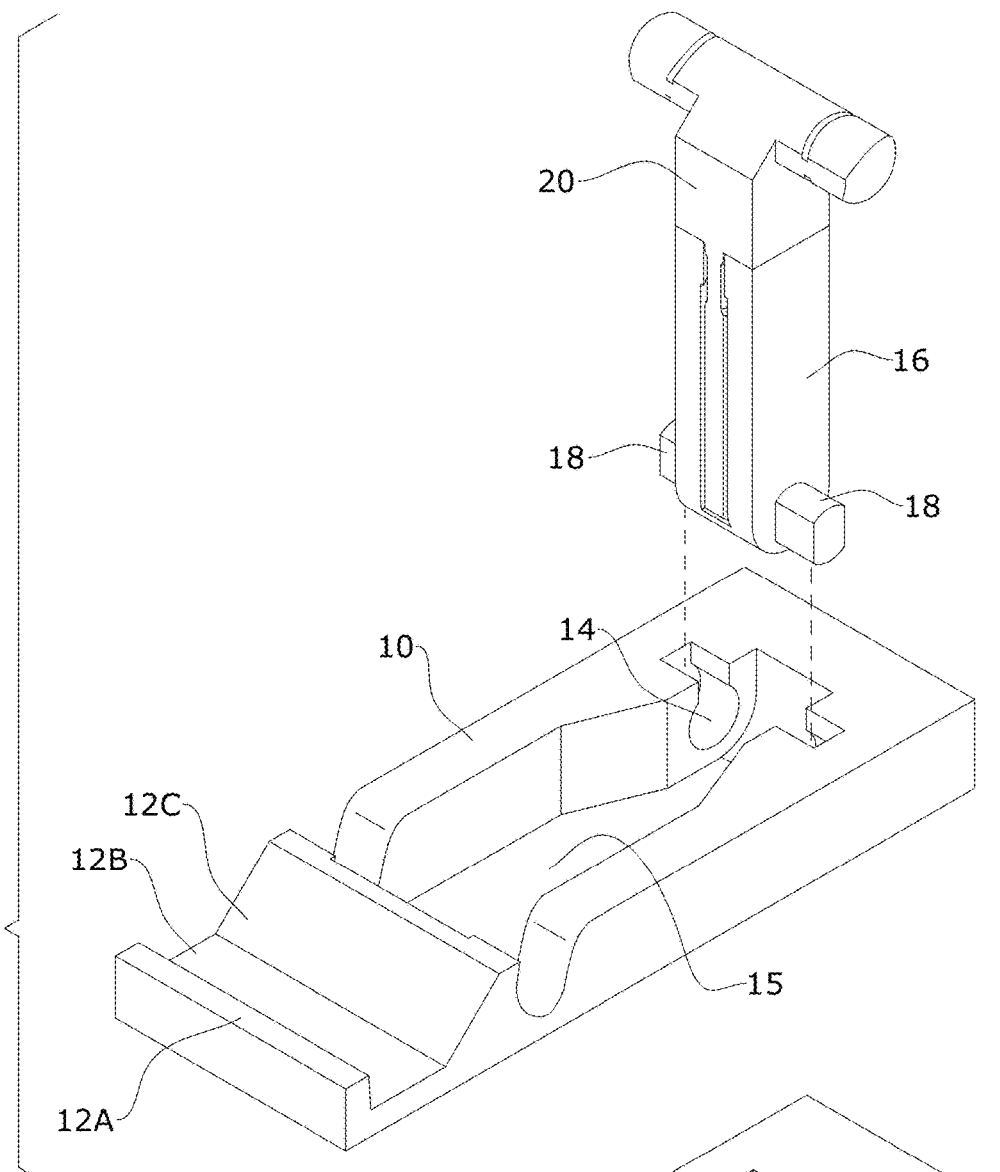
FIG. 3 is an exploded view of one embodiment of the present disclosure.

As shown in FIGS. 2 and 3, the base frame 10 may further comprise a swing arm cutout 15 extending into a portion of the base frame 10 between the angled back wall 12C and the second end of the base frame 10, wherein the swing arm cutout 15 may be sized to accommodate placement of the swing arm 16 therein. An end of the swing arm cutout 15 proximate to the second end of the base frame 10 may comprise a pair of lug notches 14, wherein the lug notches 14 are substantially circular with a narrowed opening therein from a top surface of the base frame 10. As shown in FIG. 3, the lug notches 14 may be sized to accommodate insertion of a first end of the swing arm 16 therein. More specifically, the swing arm 16 may comprise an elongate body with a first end and a second end, wherein the first end may comprise a pair of rotating lugs 18 extending outward therefrom. In embodiments, the rotating lugs 18 may each extend perpendicularly outwards from a respective side surface of the swing arm 16. The rotating lugs 18 may have a substantially rounded rectangle cross-section, such that they are capable of being inserted into the lug notches 14 when the swing arm 16 is positioned perpendicular to the base frame 10, as shown in FIG. 3, but are secured within the lug notches 14 when the swing arm 16 is at other angles with respect to the base frame 10. Rotating the swing arm 16 within the lug notches 14 may provide for varying support angles for a personal item placed in the personal item notch 12, wherein a second end of the swing arm 16 may support the personal item.

Figure 4:
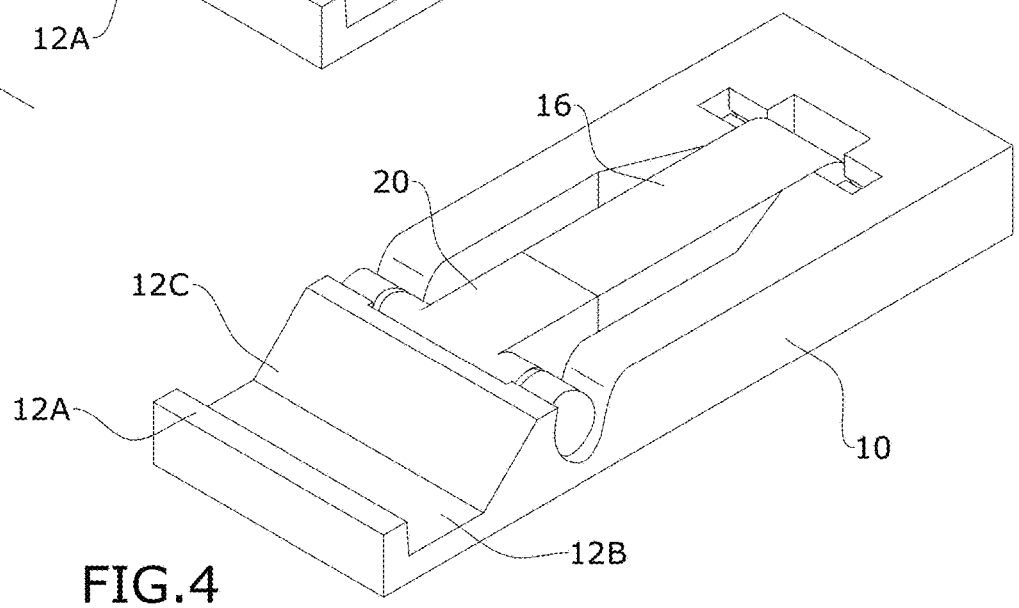
FIG. 4 is a perspective view of one embodiment of the present disclosure, shown in a folded configuration.
Figure 5:
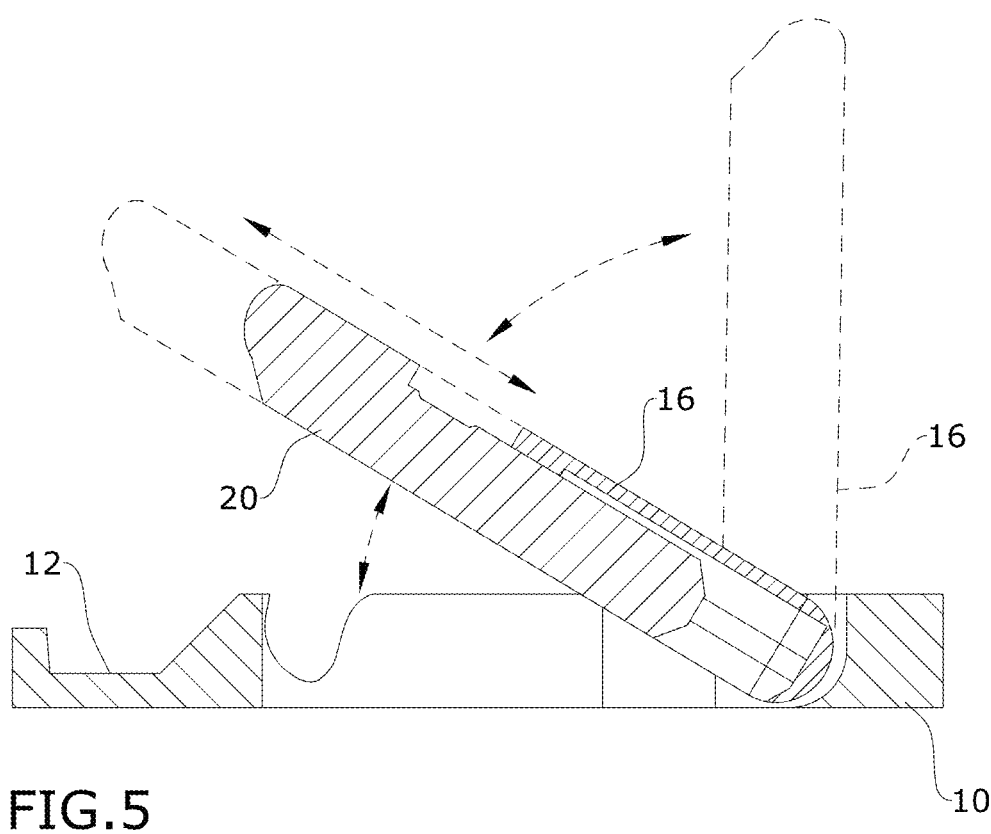
FIG. 5 is a section view of one embodiment of the present disclosure, taken along line 5-5 in FIG. 2.

In embodiments, and as shown in FIGS. 2-5, the swing arm 16 may have an adjustable length. As mentioned above, the swing arm 16 may have a first end comprising the lug nuts 18 extending therefrom. Some embodiments of the swing arm 16 may be substantially hollow and may comprise an arm extension 20 slidably engaged therewith. In such embodiments, a second end of the swing arm 16 may be open wherein the arm extension 20 is designed to slide into the swing arm 16, as shown in FIG. 5. The arm extension 20 may remain at the desired position with respect to the swing arm 16 via friction. Although, in some embodiments, the device may further comprise a locking mechanism to lock the arm extension 20 at the desired position with respect to the swing arm 16. As such, the swing arm may have an adjustable length to further adjust viewing angles of a personal item placed into the personal item notch 12. The arm extension 20 may have a distal end with any desired shape. For example, and as shown in the Figures, the distal end of the arm extension 20 may be substantially T-shaped. This may prevent the arm extension 20 from sliding completely into the swing arm 16. Because the swing arm cut out 15 may be sized to accommodate the swing arm 16 therein when the swing arm 16 is folded flush with respect to the base frame 10, the swing arm cut out 15 may comprise an elongate rectangle shape with a T-shaped end or any other shape that would accommodate the swing arm 16 therein. The T-shaped end of the cut out 15 may be open, such that a user can grasp edges of the T-shaped end of the arm extension 20 when the swing arm 16 is folded flush with the base frame, as shown in FIG. 4, to adjust the angle of the swing arm 16 with respect to the base frame 10.

Figure 6:
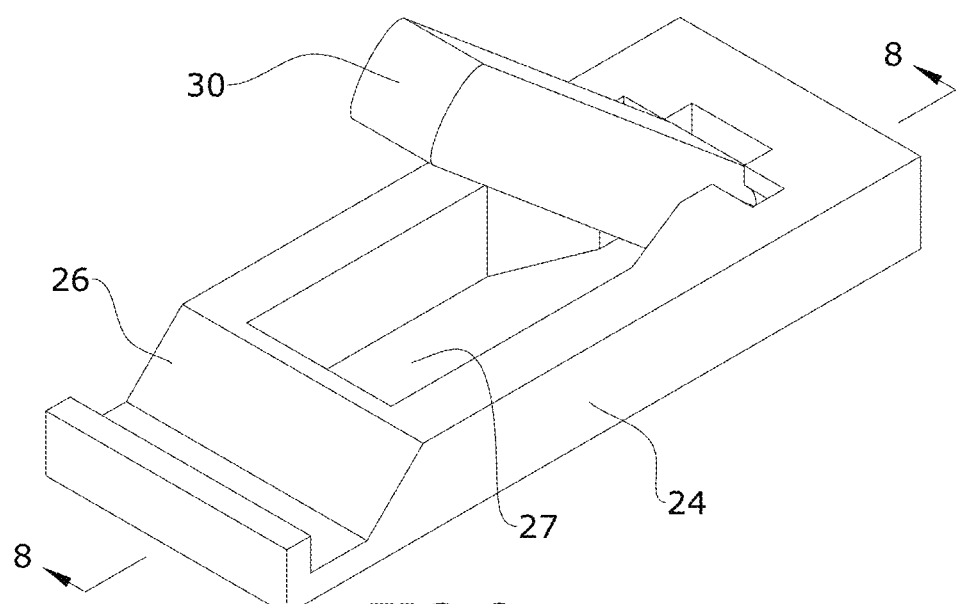
FIG. 6 is a perspective view of one embodiment of the present disclosure.

An alternative embodiment of the device of the present disclosure is shown in FIGS. 6-8. As shown in the Figures, the alternate device comprises a base frame 24 with a phone notch 26 at a first end thereof, wherein the phone notch 26 may closely correspond to phone notch 12. The base frame 24 may further comprise a swing arm notch 27 sized to accommodate placement of the swing arm 30 therein, wherein the swing arm 30 may have an elongate substantially rectangular shape. A pair of rotating lugs 32 may extend substantially perpendicularly from side surfaces of the swing arm 30 proximate to a second end of the swing arm 30. The rotating lugs 32 may be configured to removably and rotatably engage with lug notches 28 in the swing arm cut out 27, wherein the rotating lugs 32 may have a structure similar to rotating lugs 18 and the lug notches 28 may have a structure similar to lug notches 14. Other than the rotating lugs 32, the swing arm 30 may have a substantially uniform width along an entire length thereof, and an end surface of the swing arm 30 distal from the rotating lugs 32 may be slightly rounded. A portion of the swing arm cut out 27 distal from the lug notches 28 may be wider than the swing arm 30, such that a user is able to grasp the side surfaces of the swing arm 30 when it is in a folded configuration (i.e., flush with the base frame 24).

The device of the present disclosure may comprise many various materials, depending on user preferences and requirements. For example, the device may be made from plastic, metal, wood, or the like. The device may be fabricated using any conventional fabrication methods, such as 3D printing and milling.

To use the device of the present disclosure, the base frame may be placed onto a surface, such as a desk or workstation, with the personal item notch positioned toward the user. The swing arm may be lifted from the base frame, causing the lugs to rotate within the lug notches. Once the swing arm is at the desired angle with respect to the base frame, the user may simply let go and the swing arm may remain in place due to friction. In embodiments with an arm extension, the user may then pull the arm extension outward from the swing arm to its desired position, wherein again friction may keep the arm extension at its desired position. The user may then place a personal item, such as a cell phone, into the personal item notch with the back surface of the personal item resting against the distal end of the swing arm. If needed, the user may adjust the viewing angle by adjusting the angle of the swing arm or the length of the arm extension. When the user is finished using the device, the swing arm may be rotated down into the swing arm cut out for storage. While the above disclosure explains using the device of the present disclosure to support a cell phone, it is not limited to such use. Other personal items, such as signs, notepads, business cards, e-readers, books, and the like may be supported by the device of the present disclosure. As such, the device of the present disclosure is not limited to any particular dimensions and could be made larger or smaller depending on the item to be supported.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A device for holding a personal item at an adjustable angle, the device comprising:
   a base frame having a first end and a second end;
   a swing arm pivotably engaged with the base frame proximal to the second end of the base frame such that an angle of the swing arm with respect to the base frame is adjustable from flush with the base frame to perpendicular to the base frame, the swing arm comprising an elongate body with a first end and a second end;
   a personal item notch built into the first end of the base frame, the personal item notch comprising an angled back wall;
   a swing arm cutout extending into a portion of the base frame between the angled back wall and the second end of the base frame, wherein an end of the swing arm cutout proximate to the second end of the base frame comprises a pair of lug notches,
   wherein the personal item notch is sized to accommodate placement of the personal item therein when engaging the swing arm;
   the swing arm cutout is sized to accommodate placement of the swing arm therein;
   the first end of the swing arm comprises a pair of rotating lugs extending from respective side surfaces of the swing arm;
   each lug notch of the pair of lug notches is sized to accommodate a lug of the pair of rotating lugs; and
   the pair of rotating lugs are configured to rotate within the pair of lug notches.

2. The device of claim 1, wherein the personal item notch comprises:
   a raised front lip;

a bottom surface extending substantially perpendicularly from the raised front lip toward the second end of the base frame; and an angled back wall extending at an angle upwards from the bottom surface and toward the second end of the base frame.

3. The device of claim 1, wherein an end of the swing arm cutout proximate to the second end of the base frame comprises a pair of lug notches.

4. The device of claim 1, wherein the swing arm has an adjustable length.

5. The device of claim 4, further comprising an arm extension slidably engaged with the swing arm, wherein:

the swing arm is substantially hollow with an open second end; and the arm extension is configured to slide into the swing arm through the open second end.

6. The device of claim 5, wherein the arm extension comprises a T-shaped distal end.

* * * * *